(12) United States Patent
Gibson et al.

(10) Patent No.: US 12,067,012 B2
(45) Date of Patent: Aug. 20, 2024

(54) CACHE UPDATES THROUGH DISTRIBUTED MESSAGE QUEUES

(71) Applicant: Hitachi Vantara LLC, Santa Clara, CA (US)

(72) Inventors: Robert Gibson, Maynard, MA (US); Kevin Canuette Grimaldi, Waltham, MA (US); David Rush, Jr., Northborough, MA (US)

(73) Assignee: HITACHI VANTARA LLC, Santa Clara, CA (US)

(*) Notice: Subject to any disclaimer, the term of this patent is extended or adjusted under 35 U.S.C. 154(b) by 0 days.

(21) Appl. No.: 18/015,355

(22) PCT Filed: Aug. 3, 2020

(86) PCT No.: PCT/US2020/044705
§ 371 (c)(1),
(2) Date: Jan. 10, 2023

(87) PCT Pub. No.: WO2022/031259
PCT Pub. Date: Feb. 10, 2022

(65) Prior Publication Data
US 2023/0289347 A1  Sep. 14, 2023

(51) Int. Cl.
*G06F 16/00* (2019.01)
*G06F 16/23* (2019.01)
(Continued)

(52) U.S. Cl.
CPC .... *G06F 16/24552* (2019.01); *G06F 16/2365* (2019.01); *G06F 16/2471* (2019.01)

(58) Field of Classification Search
CPC .......... G06F 16/24552; G06F 16/2471; G06F 16/2365
See application file for complete search history.

(56) References Cited

U.S. PATENT DOCUMENTS 7,831,735 B1* 11/2010 Kabra ................ G06F 16/1865
709/248
2013/0254484 A1  9/2013 Garg et al.
(Continued)

FOREIGN PATENT DOCUMENTS

JP  2014-052928 A  3/2014

OTHER PUBLICATIONS

International Search Report of PCT/US2020/044705 dated Oct. 23, 2020.
(Continued)

*Primary Examiner* — Thu Nguyen T Le
(74) *Attorney, Agent, or Firm* — MATTINGLY & MALUR, PC

(57) ABSTRACT

In some examples, a first computing device may receive a first request from a second computing device. For example, the first computing device may be able to communicate with a plurality of database nodes, each database node maintaining a portion of a database distributed across the plurality of database nodes. Further, the first computing device may maintain a local cache of a subset of information maintained in the database. The first computing device may send a second request based on the first request to a first database node to cause the first database node to change the data in the database. In addition, the first computing device receives, from a message queue of a plurality of distributed message queues, a cache update message based on the change to the data in the database. The first computing device may update the local cache based on the cache update message.

20 Claims, 7 Drawing Sheets

(51) Int. Cl.
    *G06F 16/2455*     (2019.01)
    *G06F 16/2458*     (2019.01)

(56) References Cited

U.S. PATENT DOCUMENTS

| | | |
|---|---|---|
| 2014/0324785 A1 | 10/2014 | Gupta et al. |
| 2015/0264153 A1* | 9/2015 | Anand .................. H04L 49/90 709/212 |
| 2018/0019985 A1 | 1/2018 | Schoof |

OTHER PUBLICATIONS

Extended European Search Report received in corresponding European Application No. 20948065.6 dated Feb. 16, 2024.
Japanese Office Action received in corresponding Japanese Application No. 2023-507346 dated May 28, 2024.

\* cited by examiner

CACHE UPDATES THROUGH DISTRIBUTED MESSAGE QUEUES

TECHNICAL FIELD

This disclosure relates to the technical field of data storage.

BACKGROUND

Multi-partitioned databases may provide horizontal scalability by dividing data services amongst multiple computing devices, also referred to as "nodes". For example, high-availability and fault tolerance of data in the database may be enabled by replicating the database across multiple nodes and increasing the number of nodes as needed for handling increased amounts of data and/or workloads. Client services may access the database nodes to read or write data corresponding to the database. In some cases, the client nodes may maintain local caches that are a subset of the data from the database to enable the clients to route read and write requests to the correct database nodes. However, database routing may change dynamically, or other events may occur that may cause the clients to have outdated information in their local caches, which may cause uneven timing issues among the system resources, slow system response time, or the like.

SUMMARY

Some implementations include a first computing device that may receive a first request from a second computing device. Further, the first computing device may be able to communicate with a plurality of database nodes, each database node maintaining a portion of a database distributed across the plurality of database nodes. In addition, the first computing device may maintain a local cache of a subset of information maintained in the database. The first computing device may send a second request based on the first request to a first database node to cause the first database node to change the data in the database. In addition, the first computing device receives, from a message queue of a plurality of distributed message queues, a cache update message based on the change to the data in the database. The first computing device may update the local cache based on the cache update message.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
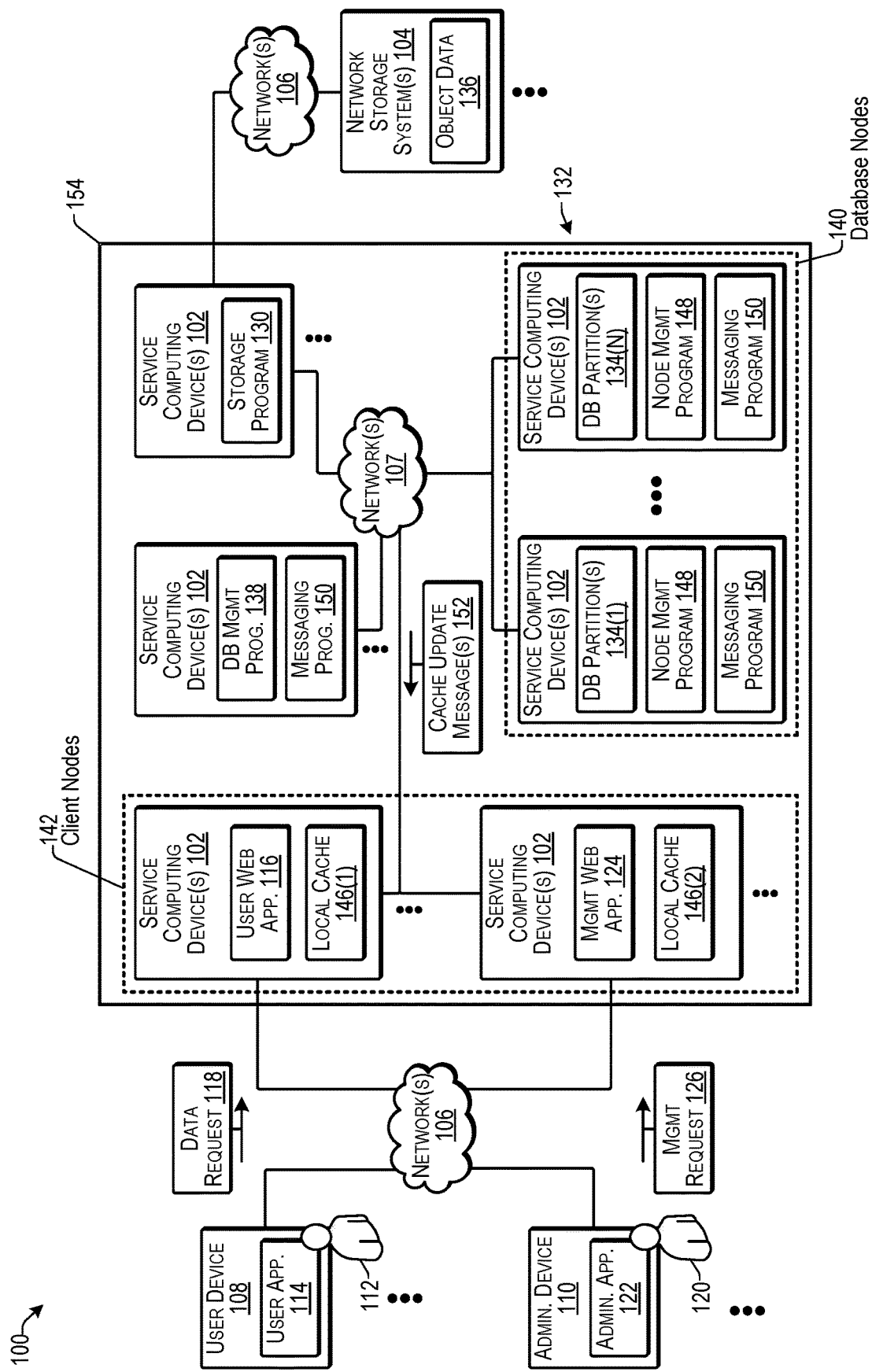
FIG. 1 illustrates an example architecture of a system that employs messaging for local cache updates according to some implementations.

Some implementations herein are directed to techniques and arrangements for a distributed computing system in which a distributed messaging queue system is used to aggregate and deliver cache invalidation messages to relevant targets. For instance, the system may include a distributed database that may tolerate client services to use slightly outdated data for some operations in favor of boosting performance and improving scaling characteristics. This allows the system to greatly reduce database loads for read-intensive workloads and also for write-intensive workloads, particularly if one or more additional optimizations are included, as discussed additionally below.

Some examples include an innovative distributed cache able to operate within a heterogeneous cloud (and/or or multi-cloud) environment. For instance in a heterogenous cloud environment, a variety of distributed nodes with different resource characteristics, e.g., compute, memory, network, etc., may work together. However, standard synchronization techniques such as a chatty publisher/subscriber protocol for synchronizing caches is not able operate well in such an environment. Accordingly, some implementations herein employ a plurality of local in-memory caches on individual client nodes that implement client services for the system. For example, the local caches may mirror certain database values used by the client services. In addition, the system herein may employ message broker queues, such as by using advanced message queuing protocol (AMQP) to periodically invalidate and/or synchronize the local caches.

In some cases, each cached data element may be configured to expire after a configurable time, so that the data element does not become overly outdated. When new values are written to the database, each client may be notified by an invalidation message that the corresponding data item has been invalidated. For additional optimization, the invalidation message may contain information about the new data value. Thus, in some cases herein, a database read is executed by a client node only if the client's local cache has no record of a specified data item, or if that data item has become invalidated without any updated value.

Some examples herein use a message broker protocol to invalidate local caches and achieve local cache synchronization across a distributed set of local caches. Further, some implementations employ delayed publishing of messages to improve performance and scalability in a message-broker-queueing-based distributed system. For instance, message queuing is by nature less lossy than some other techniques due to the ability to persist messages for longer periods of time before delivery of the message.

In some examples herein, the client nodes route their respective read and write requests to the respective subset of database nodes that are appropriate for each request. Further, the database routing may change dynamically, so the client devices may maintain current routing information based on the implementations described herein, even though the computing resources, network resources, and storage resources on the database nodes and/or the client nodes may be different, which, for example, may cause uneven timing issues between the participating entities in the system. Thus, some examples herein connect multiple heterogeneous systems, which may include public cloud storage devices connected to local or proprietary systems.

Implementations herein solve a caching problem encountered by scalable cloud storage configurations having a plurality of distributed database nodes that store and serve information along with a plurality of client nodes that store locally a subset of the information stored in the database for efficient access. Further, some examples herein may include a distributed system comprised of a set of database nodes (metadata gateway devices in some examples) and a set of client services that are executed by client nodes that are clients of the distributed database provided by the database nodes. For instance, the database nodes may store and serve information and the client nodes may access or mirror the information in the database.

For discussion purposes, some example implementations are described in the environment of one or more service computing devices in communication with a cloud storage system for managing storage and access to data using a distributed metadata database. However, implementations herein are not limited to the particular examples provided, and may be extended to other types of computing system architectures, other types of databases, other types of storage environments, other types of client configurations, other types of data, and so forth, as will be apparent to those of skill in the art in light of the disclosure herein.

FIG. 1 illustrates an example architecture of a system 100 that employs messaging for local cache updates according to some implementations. The system 100 includes a plurality of service computing devices 102 that are able to communicate with, or otherwise coupled to, at least one network storage system 104, such as through one or more networks 106. Further, the service computing devices 102 are able to communicate over the network(s) 106 with one or more user devices 108 and one or more administrator devices 110, which may be any of various types of computing devices, as discussed additionally below.

In some examples, the service computing devices 102 may include one or more servers that may be embodied in any number of ways. For instance, the programs, other functional components, and at least a portion of data storage of the service computing devices 102 may be implemented on at least one server, such as in a cluster of servers, a server farm, a data center, a cloud-hosted computing service, and so forth, although other computer architectures may additionally or alternatively be used. Additional details of the service computing devices 102 are discussed below with respect to FIG. 7.

The service computing devices 102 may be configured to provide storage and data management services to users 112. As several non-limiting examples, the users 112 may include users performing functions for businesses, enterprises, organizations, governmental entities, academic entities, or the like, and which may include storage of very large quantities of data in some examples. Nevertheless, implementations herein are not limited to any particular use or application for the system 100 and the other systems and arrangements described herein.

The network storage system(s) 104 may be referred to as "cloud storage" or "cloud-based storage" in some examples, and may enable a lower cost storage solution per megabyte/gigabyte than local storage that may be available at the service computing devices 102 in some cases. Furthermore, in some examples, the network storage system(s) 104 may include commercially available cloud storage as is known in the art, while in other examples, the network storage system(s) 104 may include private or enterprise storage systems accessible only by an entity associated with the service computing devices 102, or combinations thereof.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 102, the network storage system(s) 104, the user devices 108, and the administrative devices 110 are able to communicate over the one or more networks 106 using wired or wireless connections, and combinations thereof.

In addition, the service computing devices 102 may be able to communicate with each other over one or more networks 107. In some cases, the one or more networks 107 may be a LAN, private network, or the like, while in other cases, the one or more networks 107 may include any of the networks 106 discussed above.

Each user device 108 may be any suitable type of computing device such as a desktop, laptop, tablet computing device, mobile device, smart phone, wearable device, terminal, and/or any other type of computing device able to send data over a network. Users 112 may be associated with the user devices 108 such as through a respective user account, user login credentials, or the like. Furthermore, the user devices 108 may be able to communicate with the service computing device(s) 102 through the one or more networks 106, through separate networks, or through any other suitable type of communication connection. Numerous other variations will be apparent to those of skill in the art having the benefit of the disclosure herein.

Further, each user device 108 may include a respective instance of a user application 114 that may execute on the user device 108, such as for communicating with a user web application 116 executable as a service on one or more of the service computing device(s) 102, such as for sending user data for storage on the network storage system(s) 104 and/or for receiving stored data from the network storage system(s) 104 through a data request 118 or the like. In some cases, the application 114 may include a browser or may operate through a browser, while in other cases, the application 114 may include any other type of application having communication functionality enabling communication with the user web application 116 over the one or more networks 106.

In the system 100, the users 112 may store data to, and receive data from, the service computing device(s) 102 with which their respective user devices 108 are in communication. Accordingly, the service computing devices 102 may provide storage services for the users 112 and respective user devices 108. During steady state operation there may be users 108 periodically communicating with the service computing devices 102, such as for reading or writing data.

In addition, the administrator device 110 may be any suitable type of computing device such as a desktop, laptop, tablet computing device, mobile device, smart phone, wearable device, terminal, and/or any other type of computing device able to send data over a network. Administrators 120 may be associated with administrator devices 110, such as through a respective administrator account, administrator login credentials, or the like. Furthermore, the administrator device 110 may be able to communicate with the service computing device(s) 102 through the one or more networks 106, through separate networks, or through any other suitable type of communication connection.

Further, each administrator device 110 may include a respective instance of an administrator application 122 that may execute on the administrator device 110, such as for communicating with a management web application 124 executable as a service on one or more of the service computing device(s) 102. For instance, the administrator 120 may use the administrator application for sending management instructions for managing the system 100, as well as for sending management data for storage on the network storage system(s) 104 and/or for retrieving stored management data from the network storage system(s) 104, such as through a management request 126 or the like. In some cases, the administrator application 122 may include a browser or may operate through a browser, while in other cases, the administrator application 122 may include any other type of application having communication functionality enabling communication with the management web application 124 over the one or more networks 106.

The service computing devices 102 may execute a storage program 130, which may provide a gateway to the network storage systems(s) 104, such as for sending data to be stored to the network storage systems(s) 104 and for retrieving requested data from the network storage systems(s) 104. In addition, the storage program 130 may manage the data stored by the system 100, such as for managing data retention periods, data protection levels, data replication, and so forth.

The service computing devices 102 may further include a metadata database (DB) 132, which may be divided into a plurality of metadata DB partitions 134(1)-134(N) and which may be distributed across a plurality of the service computing devices 102. For example, the metadata DB 132 may be used for managing object data 136 stored at the network storage system(s) 104. The metadata DB 132 may include numerous metadata about the object data 136, such as information about individual objects, how to access the individual objects, storage protection levels for the objects, storage retention periods, object owner information, object size, object type, and so forth. Further, a DB management program 138 may manage and maintain the metadata DB 132 such as for updating the metadata DB 132 as new objects are stored, old objects are deleted, objects are migrated, and the like. The service computing devices 102 that include the database partitions 134 may be referred to as database nodes 140, and may each maintain a portion of the database 132 corresponding to one or more of the partitions 134.

In addition, the service computing devices 102 that execute services thereon (examples of services illustrated in FIG. 1 include the user web app 116 and the management web app 124), may be referred to as client nodes 142. Each client node 142 may maintain a respective local cache 146 (also referred to as a "near cache" or "local view" in some cases), such as a first local cache 146(1) and a second local cache 146(2) in the illustrated example. The client nodes 142 may operate as clients with respect to the metadata database 132. In some cases, the client nodes 142 may update the local caches 146 that may be maintained on the client nodes 142. For example, the local cache 146 may be periodically updated based on updates to the database 132 and/or by other techniques as discussed additionally below. Accordingly, as one example, when the user web application 116 receives a data request 118 from a user device 108, the user web application 116 may access the local cache 146(1) to determine a database node 140 to communicate with for performing the data request 118. Through the use of the local cache 146(1), the user web application 116 is able to reduce the number of queries for obtaining desired information from the metadata DB 132 for performing the data request 118.

Furthermore, some or all of the service computing devices 102 may include a respective instance of a node management program 148 that is executed by the respective service computing device 102 to manage the respective service computing device 102 as part of the system 100 and to perform other functions attributed to the service computing devices 102 herein. In the case that the service computing device 102 is a database node 140, the node management program may further manage a configuration of the database node 140 to perform the actions such as configuring the database nodes 140 into partition groups and controlling the operation of the partition groups.

As one non-limiting example, the database nodes 140 may be configured in Raft groups according to the Raft Consensus Algorithm to ensure data redundancy and consistency of the database partitions 134 of the distributed metadata database. According to the Raft algorithm, one database node 140 of each partition group may be elected as a leader and may be responsible for servicing all read and write operations for that database partition 134. Accordingly, the leader nodes may serve as metadata gateways for the client nodes 142. The other database nodes 140 are follower nodes that receive copies of all transactions to enable them to update their own metadata database information. Should the leader node fail or timeout, one of the follower nodes may be elected as leader and may take over serving read and write transactions. Client nodes of the metadata system herein are able to discover (e.g., by accessing a respective local cache 146 or sending an inquiry) which database node 140 is the leader of each partition 134 and direct requests to that database node 140.

Accordingly, the examples herein include a system able to route requests for a highly-available scalable distributed metadata database 132. The metadata database 132 herein may provide high-availability by maintaining strongly consistent copies of the metadata on separate metadata nodes 140. Further, the distributed metadata database 132 provides scalability by partitioning the metadata and distributing the metadata across distinct metadata nodes 140. Further, the solution herein optimizes the ability for a client application to find the partition leader for a given request.

To enable updating of the local caches in an efficient manner, at least some of the service computing devices 102 may execute a messaging program 150. For example, the messaging program 150 may enable creation of cache update messages 152 for updating the local queues 146 following a change in database data, database configuration, or the like. In some examples, the messaging program employed herein may include a message-broker program that implements one or more of the Advanced Message Queuing Protocol (AMQP), Streaming Text Oriented Messaging Protocol (STOMP), Message Queuing Telemetry Transport (MQTT), and/or other suitable messaging protocols. Several non-limiting examples of software that may be used in some implementations include APACHE QPID, JORAM, APACHE ACTIVEMQ, and RABBITMQ. For example, AMQP is a standard protocol that is able to connect applications on different platforms.

In some situations, an item in a local cache 146 may become invalid either through timeout expiration or else upon receiving a message indicating that the value has been updated. An invalid item may be effectively removed from the local cache 146 by the client node 142, e.g., by the respective service(s) executing on the respective client node 142. For instance, each service that is executed on a client node may maintain its own local cache 146 that may be used by the respective service and that may be updated by the service based on received cache update messages 152.

In some examples, when the value of an item of data is changed in the database 132, a cache invalidation message 152 providing notification of the change using the AMQP messaging protocol may be immediately published, such as based on an instruction from a metadata node 140 having information regarding the change. The update to the database 132 and the generating of the cache update message 152 may be performed in line, e.g., the cache update message 152 may be generated immediately after the update is made to the database, but the update to the database and generation of the cache update message 152 may be performed asynchronously with respect to each other.

The client nodes 142 may be configured to listen for cache update messages 152 indicating data-change events that are relevant to the cache type(s) of their respective local caches 146. For instance, there may be different types of local caches 146 of different data types, such as for different types of services executed by the client nodes 142 The cache update message 152 may be routed separately for each different cache type, so that client nodes 142 having cache types different from the cache type to which a particular cache update message 152 pertains need not process data they will not use. In addition every local cache instance (of the appropriate type) receives a cache update message 152 for that data type indicating that the data item is invalid.

In some examples, a node, such as a database node 140, a client node 142, or other computing node herein, may be a single physical or virtual machine that may maintain one or more of the programs, services, or data described herein. All of the logical components, e.g., the metadata gateways, as well as the client services, may execute on any physical service computing devices 102 within the system 100. The distributed metadata database 132 may use dynamic partitioning in which data stored by the respective metadata nodes 140 may be partitioned into a set of manageable chunks (partitions 134) to distribute the data of database 132 across the plurality of metadata nodes 140. As the partitions 134 grow, the system may dynamically split the partitions 134 to form two or more new partitions, and may migrate the new partitions to metadata nodes 140 that have sufficient storage capacity to receive them and/or to newly-added metadata nodes 140.

Communications within the system 100 may slow when new metadata nodes 140 are added to the system 100, such as to meet data growth. For example, at least a portion of information included in the local caches 146 may become invalid. Similarly the client service nodes may also be scaled to match incoming workloads by adding new client nodes 142. As mentioned above, the client nodes 142 may each maintain one or more local caches 146 that are an in-memory cache that mirrors a subset of the information stored in the metadata database nodes. The local caches 146 may increase system efficiency by greatly reducing the need for and the frequency of database queries. For instance, in a highly distributed system, constant accesses from client nodes directly resulting in database queries (e.g., where the requested data is stored in a persistent media such as hard disks) can be expensive and can increase system latency.

In some cases, the data in the distributed database 132 may be updated through user requests and updates might occur only on specific database nodes 140. Consequently, when a mirror of the updated data exists in the local cache(s) 146 of one or more client nodes 142, then that data becomes stale or invalid. Accordingly, some examples herein may keep the data in the local caches 146 refreshed asynchronously using a distributed invalidation scheme. As one example, a service may periodically mark the data in the local cache 146 as invalid. Upon arrival of a new request for that data, the service may update the local cache 146 by querying the database 132 for the latest values in the database 132.

An example algorithm for invalidating and updating the local caches 146 includes the following. (1) Each client node 142 maintains a local cache 146 of data that the client node 142 has previously retrieved from the database 132 on an as-needed basis. (2) A client node 142 may have multiple local caches 146, each holding a different type of data and configured with different, optimized parameters, such as for use by one or more services executed on the client node 142. (3) Each item of data in a local cache 146 may expire after a configurable amount of time. For instance, the expiration time may be chosen to minimize database accesses, while also preventing data in the local cache 146 from going far out of date. (4) When the value of an item of data is changed in the database 132, a cache update message 152 advertising the change using a messaging protocol such as AMQP, may be immediately generated and published. The update in the database 132 and the generation of the message may be performed in line. (5) Each service listens for cache update messages 152 indicating data-change events for a respective type of cache used by the service. In some examples, the cache update messages 152 may be routed separately for each cache type, so that client nodes 142 and services managing local caches need not process data they will not use. (6) Every local cache instance (of the specified type) receives a cache update message 152 for that data type indicating that the data item is invalid. (7) An item may become invalid through at least one of expiration of a timeout, or upon receiving a cache update message 152 indicating that the item value has been updated. An invalid item is effectively removed from the local cache, such as by marking the item as deleted or otherwise allowing the storage location of the item to be overwritten in due course. (8) When a client needs to access a data item, the cache returns any value it has stored immediately. If there is no stored value, or if that value has been invalidated, the program managing the local cache 146 may request the current value from the database 132. (9) Cache update messages 152 may be configured with a "time-to-live" value so they do not survive past their useful lifetime. For example, items in the local caches 146 may be automatically expired after a certain time. (10) As an additional optimization, in some examples, the cache update message 152 may contain a partial or full value for the updated data. This raises the possibility that multiple client nodes may update a value simultaneously. In that case, a distributed tick counter may be used by the programs managing the respective local caches 146 to identify which value is most recent. This optimization may reduce the database load even further for write-heavy workloads.

With the architecture and algorithm discussed above, the amount of accesses to the database 132 by the client nodes 142 may be greatly reduced for read-intensive workloads. Furthermore, the system 100 may be configured with an expiration threshold that prevents the local caches 146 from becoming out of date beyond the threshold. A separate expiration threshold may be configured for each different type of local cache 146 and/or for individual local caches of the same type on different client nodes 142. For example, a local cache 146 may be configured to expire least-recently-used data to enforce memory usage limits.

Furthermore, the local caches 146 may be updated due to internal events. For example, a local cache 146 may be configured to store all system metadata except for user object metadata that could grow to trillions of pieces of metadata. In this case, the system metadata that is mirrored in the local cache 146 may be user driven or internal system metadata such as a metadata partition map. The metadata partition map is a table or other data structure that includes partition identifiers (IDs) and the IDs of the database nodes 140 on which the respective partitions reside. All user requests related to object management such as putObject and getObject requests may cause a service (e.g., the user web app 116) to look up at least four different metadata types, such as user information, bucket information, partition information, and object information. Thus, in some cases, it is possible that all four types of metadata may get refreshed due to a single user request. To avoid such a situation, some examples herein may employ a dynamic metadata partitioning technique that involves dividing all the metadata types and tables into the partitions 134. The partitions 134 are distributed across the database nodes 140 to provide uniform load management. Partition map invalidation may occur when a metadata partition is split into two or more partitions. While the partition split may not be driven by user requests, the invalidation and further refresh procedure may be similar to the refresh resulting from user operations such as the putObject and getObject requests discussed above.

Furthermore, to achieve better response times for end users, the cache updates herein may be performed asynchronously with respect to user write requests. Hence, there may be a small delay before which the local caches 146 of the services distributed across the system 100 on the client nodes will be invalidated or otherwise updated. For instance, the actual time to invalidate or otherwise update a local cache 146 may be variable based on network and system activity. The AMQP messaging protocol that may be used herein is inherently robust since cache update messages 152 may be queued before delivery. Accordingly, cache update messages 152 may be aggregated across multiple database updates. For example, suppose that a bucket, user, and partition map update all occurred and are enqueued concurrently, then there may be only one cache update message 152 actually sent to the respective services on the client nodes 142. Nevertheless, cache update messages 152 via AMQP may still be lost in some situations, such as due to temporary network failure, or the like. Accordingly, implementations herein may include a mechanism to retry delivering messages up to a specific threshold of attempts.

Further, in the case where the delivery of the cache update message 152 from queueing fails, the local caches 146 may perform invalidation or other cache updates based on a time threshold being exceeded. For instance, when the last update for a given cache value exceeds a certain timeout value, the local cache 146 may be configured to automatically invalidate that entry. The timeout threshold employed for invalidation herein may be configurable so that the timeout threshold may be adjusted based on system workload dynamics, or the like.

In some cases, the service computing devices 102 may be arranged into one or more groups, clusters, systems, or the like, at a site 154. In some cases a plurality of sites 154 may be geographically dispersed from each other such as for providing data replication, disaster recovery protection, or the like. Further, in some cases, the service computing devices 102 at a plurality of different sites 154 may be configured for securely communicating with each other, such as for providing a federation of a plurality of sites 154.

Figure 2:
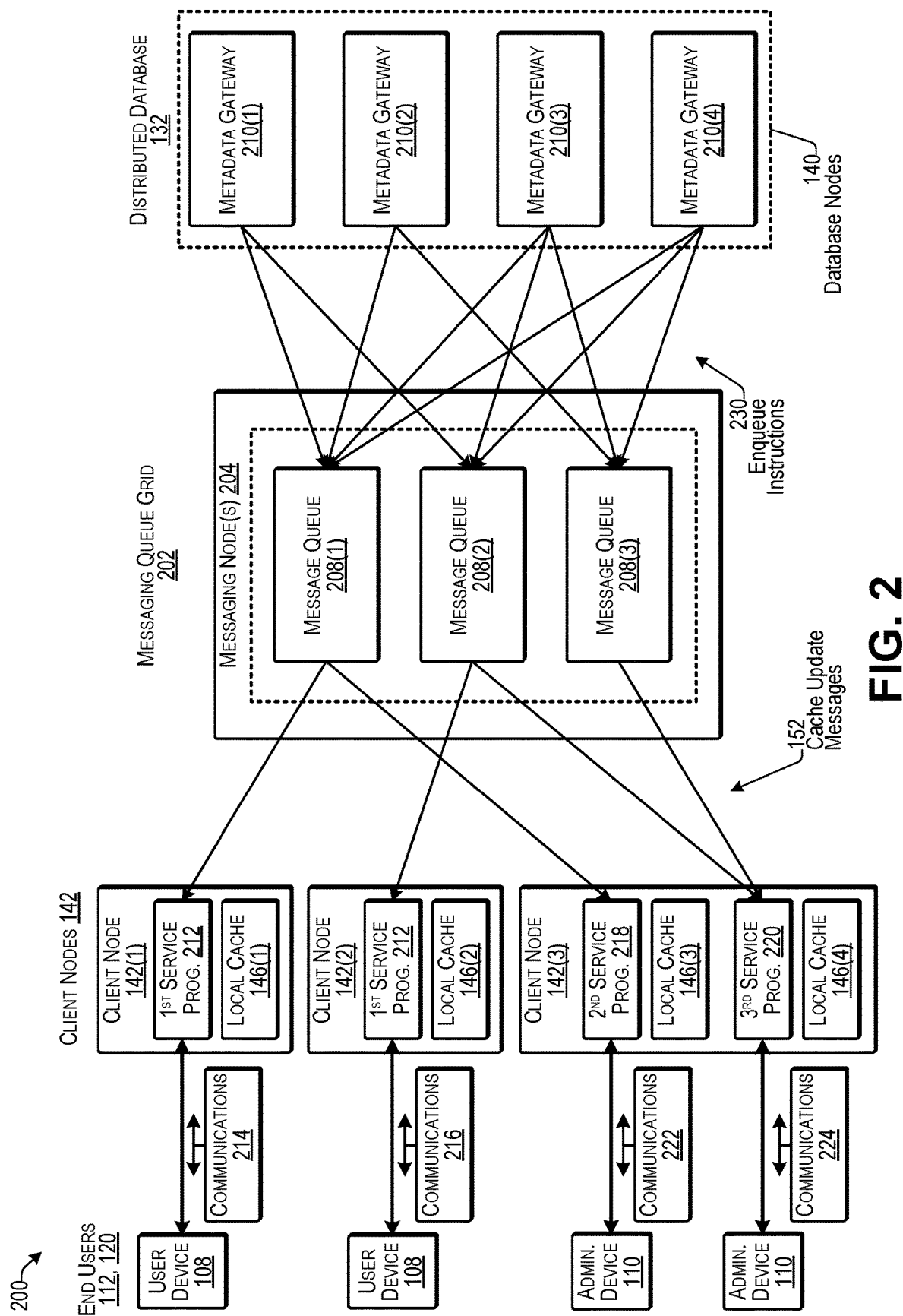
FIG. 2 is a block diagram illustrating an example logical configuration of a system according to some implementations.

FIG. 2 is a block diagram illustrating an example logical configuration of a system 200 according to some implementations. In some examples, the system 200 may correspond to the system 100 discussed above or any of various other possible computing system architectures, as will be apparent to those of skill in the art having the benefit of the disclosure herein. The system 200 may enable distributed object storage and may include the use of web applications as front end services for users and administrators. In some cases, the system 200 may store objects on the network storage (not shown in FIG. 2) in buckets that may be created by the end users 112, 120. The system 200 may enable complex management and storage of data using resources distributed across on-premises and cloud systems. In the system 200, scalability may be provided by logically partitioning the stored metadata that is stored in the distributed database 132.

The system 200 of FIG. 2 may include a distributed system of client nodes 142 and database nodes 140 able to tolerate client nodes 142 using outdated cache data for some operations, which can improve system performance and scaling characteristics. This provides reduced database loads for read-intensive workloads, and also for write-intensive workloads in some examples. For example, when new values are written to the distributed database 132, individual client nodes 142 having respective local caches 146 may receive cache update messages 152 indicating that the corresponding data item has been invalidated. For additional optimization, the cache update message 152 may contain information about the new data value. Furthermore, a database read may be executed when a local cache 146 has no record of a data item, or that data item has become invalid without any updated value.

In this example, the system 200 incorporates a messaging queue grid 202 for queueing and routing the cache update message 152 to the services executing on the client nodes 142. For instance, the messaging queue grid 202 may be provided by the messaging program 150 discussed above with respect to FIG. 1, and may be hosted on one or more messaging nodes 204. The messaging nodes 204 may correspond to one or more of the service computing devices 102 discussed above, which may execute the messaging program 150. In some cases, the messaging program 150 may be executed on the same service computing devices 102 that serve as the database nodes 140, and/or on the service computing devices 102 that serve as the client nodes 142, and/or on other service computing devices 102 in the system 100 discussed above with respect to FIG. 1. The messaging queue grid 202 may include a plurality of message queues such as message queue 208(1), message queue 208(2), and message queue 208(3), each of which may be maintained in a separate virtual container, such as a DOCKER container or the like. In some examples, the message queues 208(1)-208(3) may be maintained on separate physical or virtual machines.

In this example, the distributed database 132 includes a plurality of metadata gateways 210, which may correspond to the database nodes 140. For instance, as discussed above, in some examples, each database partition 134 may be maintained by a partition group of two or more database nodes 140. Each partition group may have a leader node that responds to user read and write requests to that respective partition 134. Accordingly, the partition leader for each partition group may serve as the metadata gateway 210 for that partition 134. In this example, four metadata gateways 210(1)-210(4) are illustrated for explanation purposes; however, in actual implementations, some examples of the systems herein may include a much larger number of metadata gateways 210, depending on the number of database partitions 134.

The message queues 208 are configured to deliver cache update messages 152 to services executing on the client nodes 142. In this example, a first service program 212 may correspond to the user web application 116 discussed above that may provide a user device 108 data access services. For example, the first service program 212 may maintain a local cache 146(1) containing information that may be used to access the metadata gateways 210. For example, the first service program 212 may provide client functionality for enabling the client node 142(1) to interact with the metadata gateways 210 for retrieving metadata. In addition, the first service program 212 may provide functionality for receiving the cache update messages 152 for updating the associated local cache 146(1). Further, the first service program 212 may interact with the storage program 130 (not shown in FIG. 2), such as for retrieving object data 136 based on retrieved metadata and/or metadata maintained in the local cache 146(1), such as discussed above with respect to FIG. 1. Further, the first service program 212 may exchange communications 214 with a user device 108, such as for sending or receiving user data.

In this example, a second client node 142(2) may also execute an instance of the first service program 212, may maintain a local cache 146(2), and may exchange communications 216 with another user device 108. In addition, in this example, a third client node 142(3) executes two services, namely a second service program 218 and a third service program 220. For example, the second service program may correspond to the management web application 124 discussed above with respect to FIG. 1 that provides management services to the administrators. For example, the second service program 218 may include client functionality for interacting with other nodes in the system 200, including the client nodes 142, the messaging nodes 204, and/or the database nodes 140. The second service program 218 may exchange communications 222 with an administrator device 110, such as for receiving management instructions, providing status updates, and so forth. The second service program 218 may maintain a local cache 146(3) that, in some examples, may contain one or more data types that are different from the data types maintained in the local caches 146(1) and 146(2), or vice versa.

In addition, the third service program 220 may provide another type of service that is different from the services provided by the first serviced program 212 and the second service program 218. As several non-limiting examples, the third service may include garbage collection, object data management, or the like. The third service program 220 may exchange communications 224 with an administrator device 110, such as for receiving management instructions, providing status updates, and so forth. The third service program 220 may maintain a local cache 146(4) that, in some examples, may include one or more data types that are different from the data types maintained by the local caches 146(1), 146(2) and 146(3), or vice versa.

When a metadata gateway 210 changes the value of an item of data in the distributed database 132, or otherwise makes a change to the database 132, the metadata gateway 210 may send an enqueue instruction 230, which may include information about the changed value to one of the message queues 208. In some examples, the message queue 208 may be selected at random, although other selection techniques may alternatively be used.

Receipt of the enqueue instruction may cause the messaging program 150 at the respective messaging node 204 to generate a cache update message 152 and add the cache update message 152 to the respective message queues 208. For example, the cache update message 152 may be generated, queued and distributed according to the AMQP messaging protocol. As mentioned above, the cache update messages 152 may be advertised or otherwise routed to the respective service programs 212, 218, 220 executing on the client nodes 142.

As one example, the cache update messages 152 may be routed separately for each different type of local cache 146, depending on the data types included therein and the data type affected by the update to the database 132. For instance, if the local caches 146(1) and 146(2) have one or more data types corresponding to the update, and the local caches 146(3) and 146(4) do not include these one or more data types, the cache update messages 152 directed to the first service program 112 are not routed to the second service program 218 or the third service program 220 based on identification of the data type affected by the change, an indication of which may be provided, e.g., by the metadata gateway 210 that made the change to the database 132. Accordingly, the service programs whose caches are not affected by a change to the database 132 may not receive or process cache update messages 152 that are not relevant to their respective local caches 146.

Figure 3:
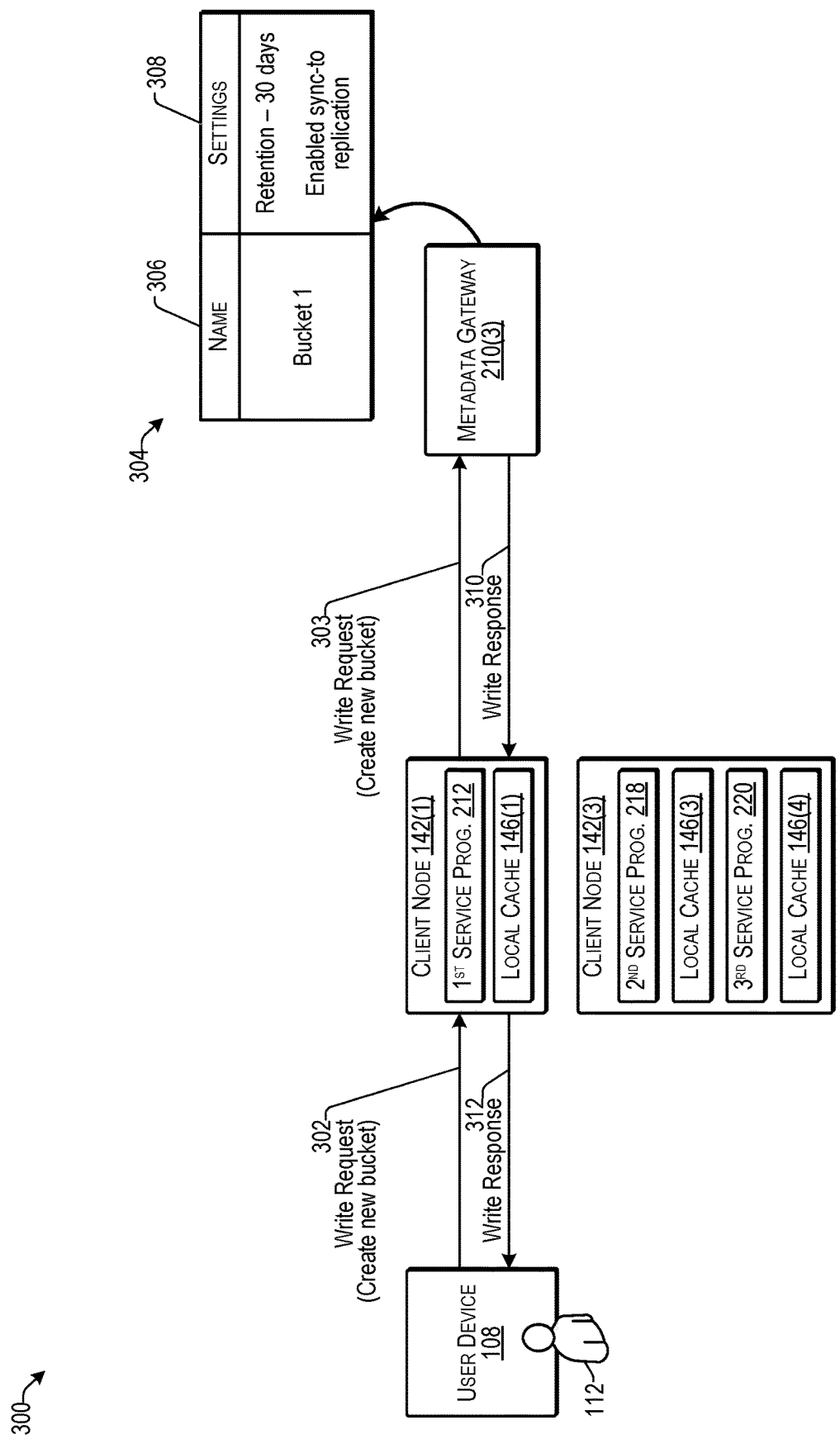
FIG. 3 is a block diagram illustrating an example of creating a new bucket according to some implementations.
Figure 4:
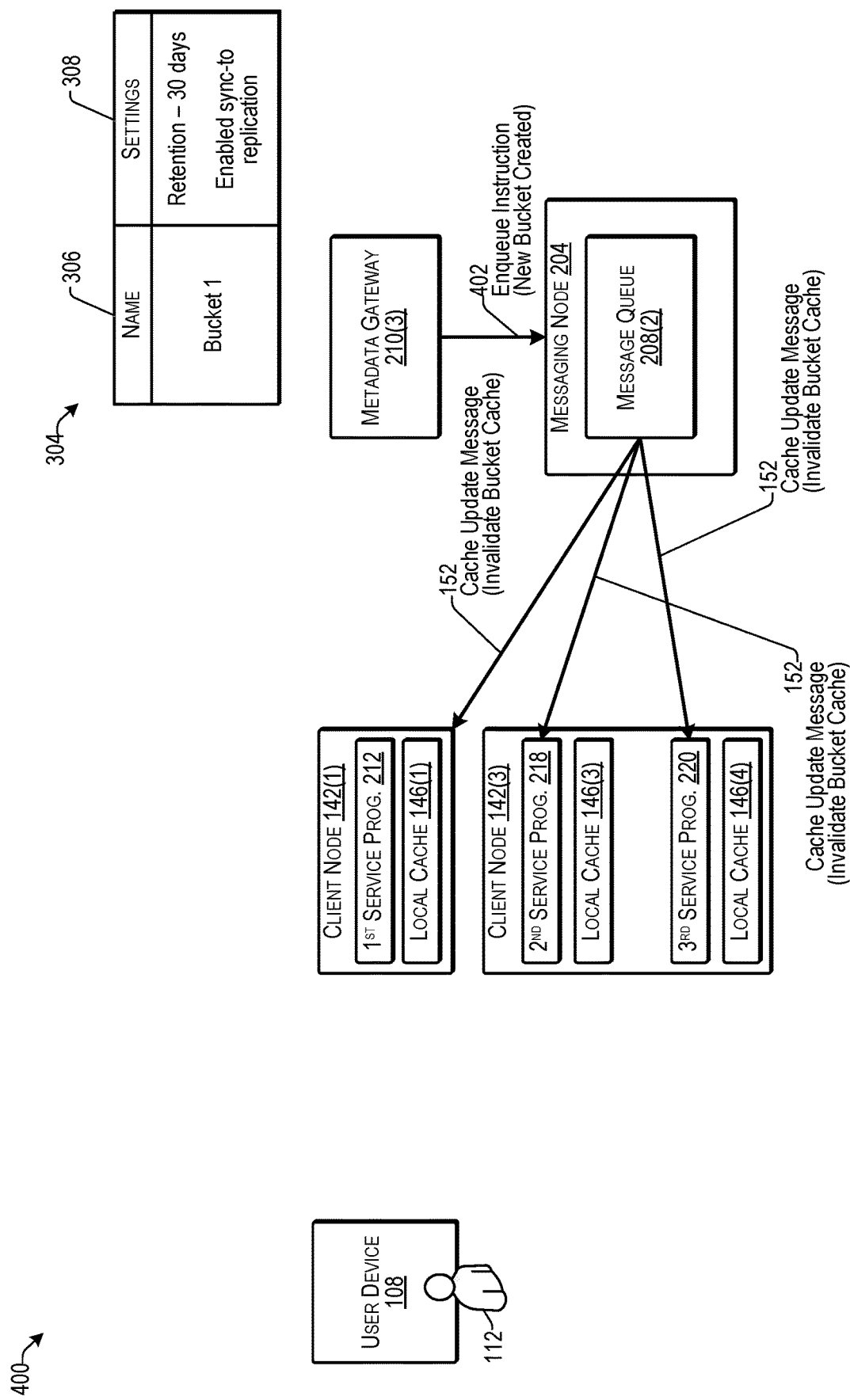
FIG. 4 is a block diagram illustrating an example of invalidating local caches using a distributed messaging queue according to some implementations.
Figure 5:
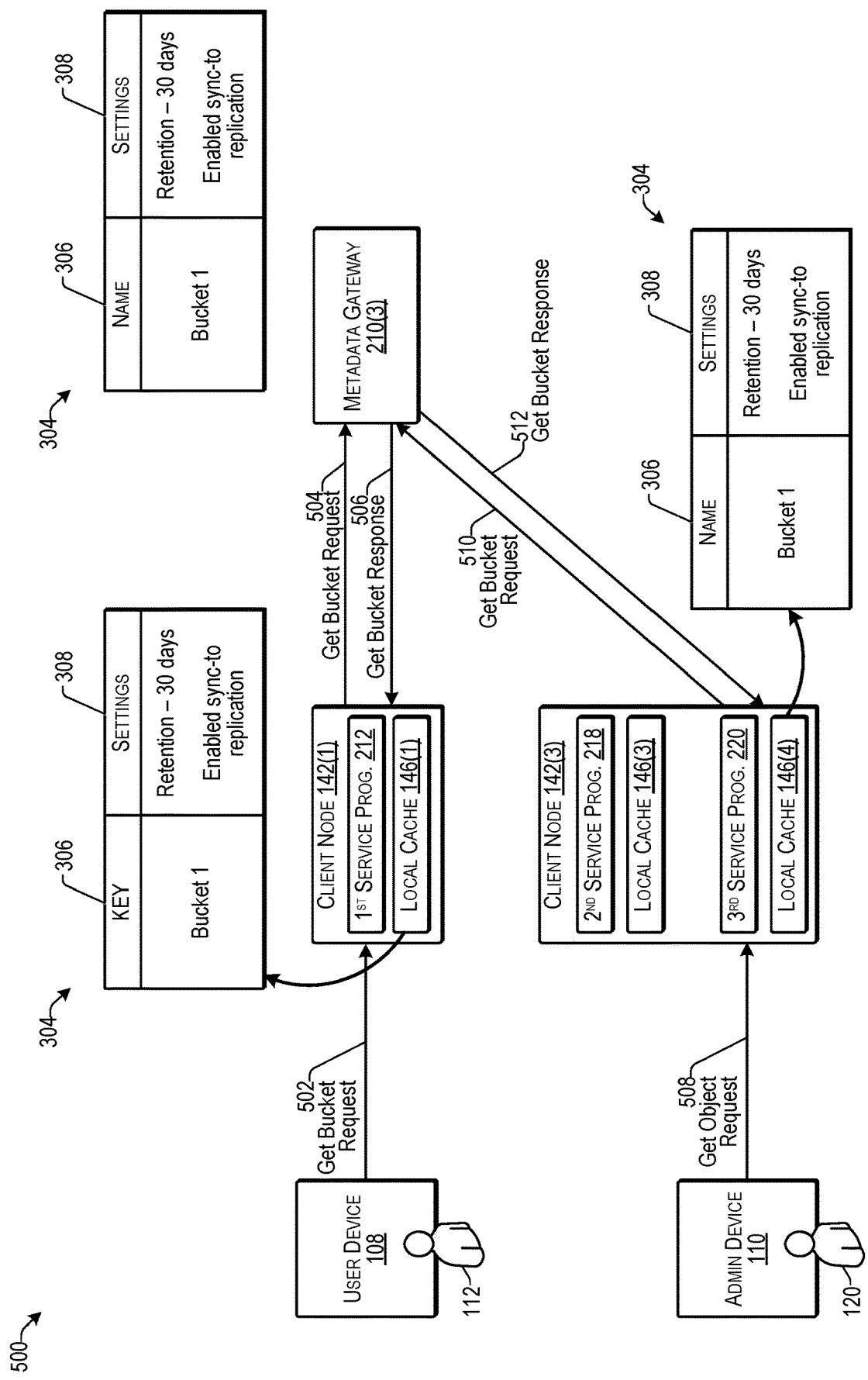
FIG. 5 is a block diagram illustrating an example of updating a local cache according to some implementations.

FIGS. 3-5 illustrate an example of creating a new bucket in the database 132; invalidating, due to the change in the database, existing local caches 146 of several services that include bucket information in their local caches; and subsequently updating several local caches to include the updated database information. The example of FIGS. 3-5 may correspond in part to example system 200 of FIG. 2 discussed above; however, the client node 142(2) is omitted for clarity of illustration. Other non-participating components are also excluded.

FIG. 3 is a block diagram illustrating an example 300 of creating a new bucket according to some implementations. In this example, suppose that the user 112 of the user device 108 sends a write request 302 to cause creation of a new bucket at the network storage system(s) 104 (not shown in FIG. 3). The first service program 212 may receive the write request 302 and, in response, may send a write request 303 to the metadata gateway 210(3), such as based on routing information currently included in the local cache 146(1). In response, the metadata gateway 210(3) may update the metadata in the database 132, such as by creating a new record 304 for the new bucket. In this example, suppose that the record 304 includes a name 306 of the bucket (i.e., "Bucket 1") and settings 308 for the bucket, which include a retention period of 30 days and synchronization settings. The bucket may also be created at the network storage systems 104 (not shown in FIG. 3). The metadata gateway 210(3) returns a write response 310 to the first service program 212. In turn, the first service program 212 returns a write response 312 to the user device 108 indicating that the bucket has been created.

FIG. 4 is a block diagram illustrating an example 400 of invalidating local caches using a distributed messaging queue according to some implementations. In this example, in association with creation of the new bucket, as discussed above with respect to FIG. 3, the metadata gateway 210(3) may send an enqueue instruction 402 to one of the messaging nodes 204 that include one of the message queues, i.e., message queue 208(2) in this example. As mentioned above, in some examples, the message queue 208(2) and/or messaging node 204 may be selected by the metadata gateway 210(3) at random. In other examples, the metadata gateway 210(3) may employ any other suitable technique for selecting one of the message queues 208(2)/messaging nodes 204 to receive the enqueue instruction 402. In some examples, the metadata gateway 210(3) may include the record 304 created in the database with the enqueue instruction 402; however, in this example, suppose that the metadata gateway 210(3) merely identifies the data type of the metadata record affected by the change made to the database (i.e., a bucket).

Based on receiving the enqueue instruction 402, the messaging node 204 may create a cache update message 152 to send to the services that maintain local caches with bucket information. In this example, suppose that all of the first service program 212, the second service program 218, and the third service program 220 include bucket information in their local caches 146(1), 146(3), and 146(4), respectively. The messaging node 204 may add the cache update message 152 to the message queue 208 to distribute the cache update message 152 to the services. For example, the messaging node may determine the types of local caches maintained by each of the services for correctly routing the cache update messages 152. Thus, the messaging node 204 may use the message queue 208-2 to deliver the cache update message 152 to the first service program 212, the second service program 218, and the third service program 220. In response, the first service program 212 may invalidate or otherwise update the bucket portion of the local cache 146(1); the second service program 218 may invalidate otherwise update the bucket portion of the local cache 146(3); and the third service program 220 may invalidate or otherwise update the bucket portion of the local cache 146(4).

FIG. 5 is a block diagram illustrating an example 500 of updating a local cache according to some implementations. In this example, suppose that the user 112 uses the user device to submit a get bucket request 502 to the first service program 212. In response, the first service program 212 determines that the bucket portion of the local cache 146 has been invalidated and sends a get bucket request 504 for the bucket information. In response, the metadata gateway 210 (3) may provide a get bucket response 506 that includes a copy of the record 304 from the database 132 that may be added to the local cache 146(1) by the first service program 212.

Similarly, suppose that the administrator 120 uses the administrator device 110 to send a get object request 508 to the third service program 220. The third service program 220 may send a get bucket request 510 to query the metadata gateway 210(3) to request information related to the bucket (bucket 1) that contains the requested object. In response, the metadata gateway 210(3) may send a get bucket response 512 to the third service program 220 may include a copy of the metadata record 304 that the third service program 220 may add to the local cache 146(4) to refresh the bucket portion of the local cache 146(4).

Furthermore, while in this example, the services queried the metadata gateway to obtain the updated information for the new bucket from the database 132, in other examples, as mentioned above, the record 304 may have been included in the cache update message 152 previously sent to the services to invalidate the associated local caches 146. Accordingly, in this alternative example, it would have been unnecessary for the first service 212 and the third service 220 to query the metadata gateway 210 for the bucket record 304, as this information would have already been in included in the respective local caches 146(1) and 146(4).

Figure 6:
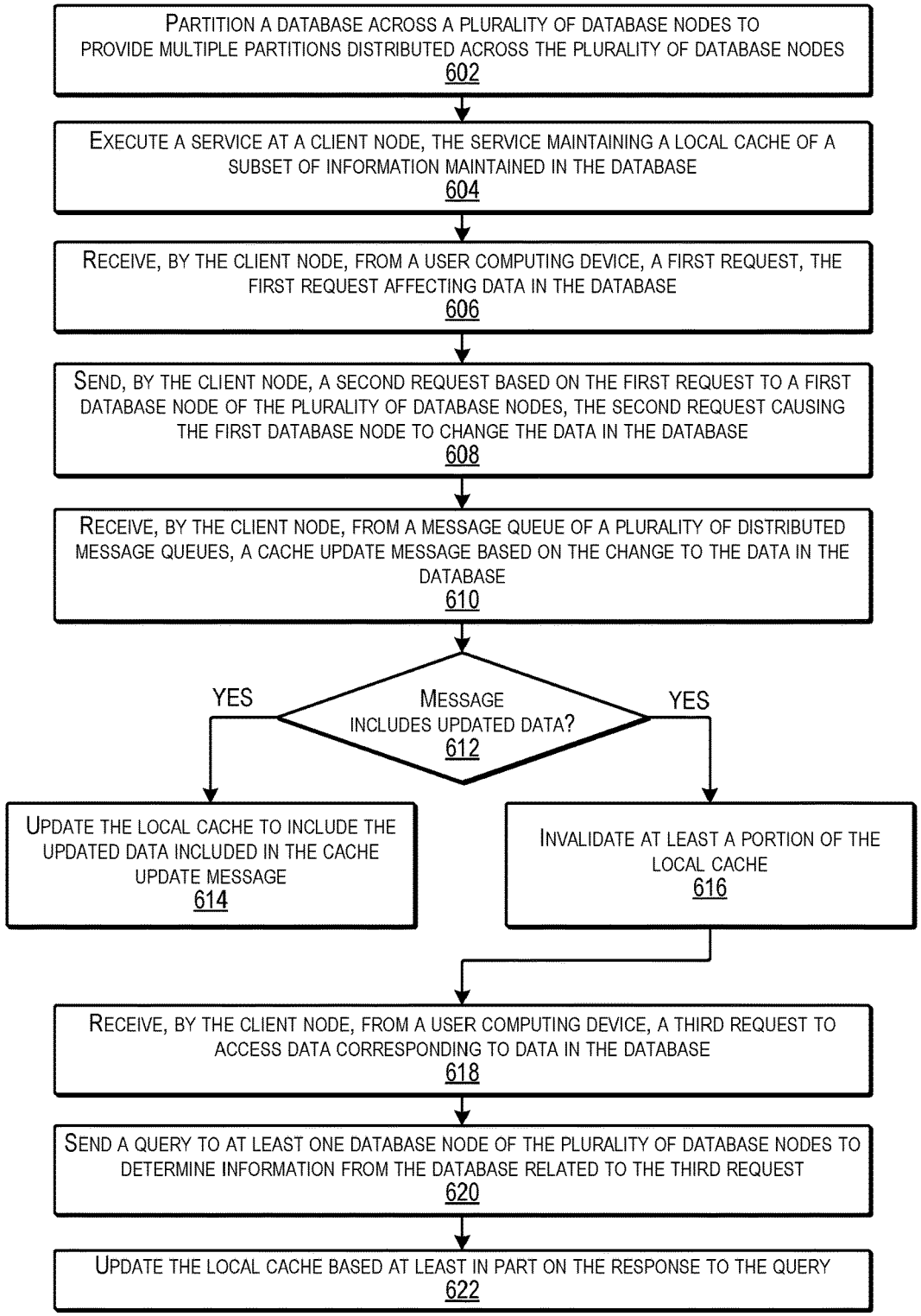
FIG. 6 is a flow diagram illustrating an example process for updating a local cache using distributed messaging queues according to some implementations.

FIG. 6 is a flow diagram illustrating an example process for updating a local cache using distributed messaging queues according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems. In FIG. 6, the process 600 may be executed at least in part by a client node executing one or more of the services programs 212, 218 or 220.

At 602, a service computing device may partition a database across a plurality of database nodes to provide multiple partitions distributed across the plurality of database nodes.

At 604, a client node may execute a service, the service maintaining a local cache of a subset of information maintained in the database.

At 606, the client node may receive, from a user computing device, a first request, the first request affecting data in the database. For example, the client node may receive a write request or other request that will change the data in the database.

At 608, the client node may send a second request based on the first request to a first database node of the plurality of database nodes, the second request causing the first database node to change the data in the database.

At 610, the client node may receive, from a message queue of a plurality of distributed message queues, a cache update message based on the change to the data in the database.

At 612, the client node may determine whether the received cache update message included the updated data. If so, the process goes to 614. If not, the process goes to 616.

At 614, the client node may update the local cache to include the updated data included in the cache update message.

At 616, the client node may invalidate at least a portion of the local cache in response to the cache update message.

At 618, the client node may receive, from a user computing device, a third request to access data corresponding to data in the database.

At 620, the client node may send a query to at least one database node of the plurality of database nodes to determine information from the database related to the third request.

At 622, the client node may update the local cache based at least in part on the response to the query received from the database node.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
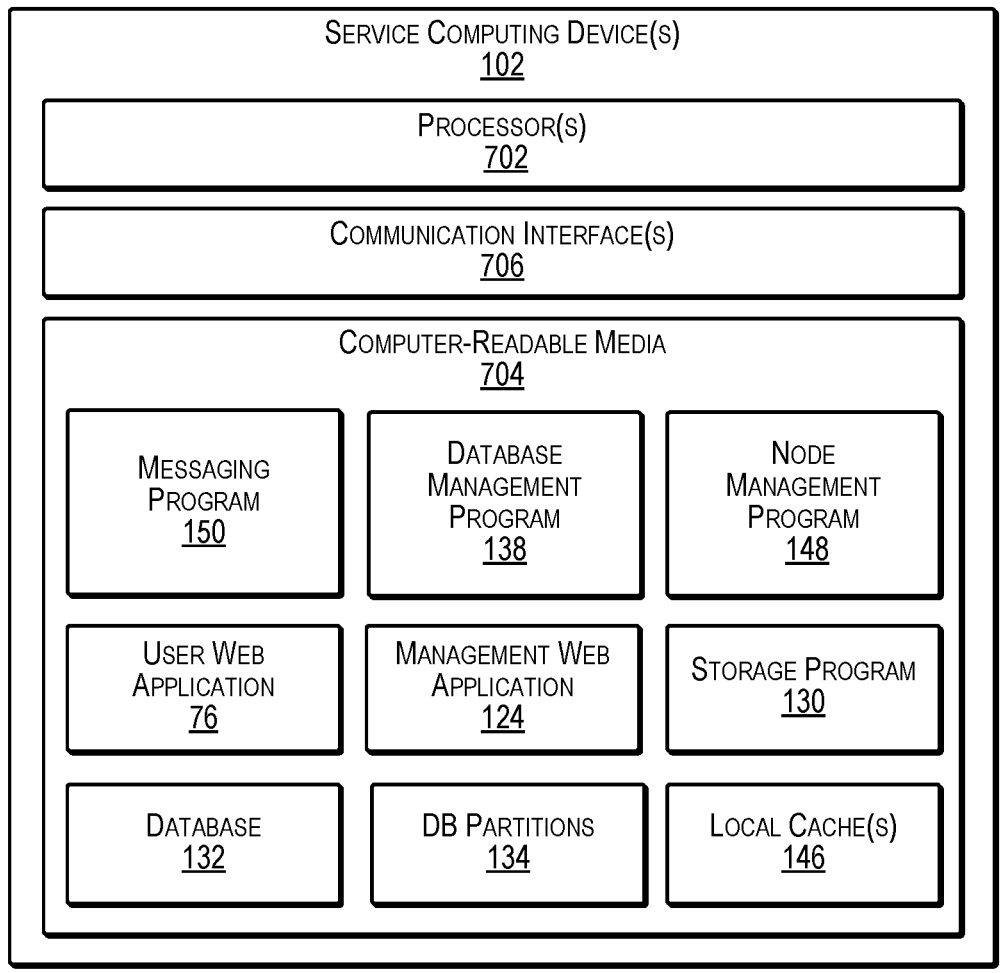
FIG. 7 illustrates select example components of the service computing device(s) that may be used to implement at least some of the functionality of the systems described herein.

FIG. 7 illustrates select example components of the service computing device(s) 102 that may be used to implement at least some of the functionality of the systems described herein. The service computing device(s) 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 702, one or more computer-readable media 704, and one or more communication interfaces 706. Each processor 702 may be a single processing unit or a number of processing units, and may include single or multiple computing units, or multiple processing cores. The processor(s) 702 can be implemented as one or more central processing units, microprocessors, microcomputers, microcontrollers, digital signal processors, state machines, logic circuitries, and/or any devices that manipulate signals based on operational instructions. As one example, the processor(s) 702 may include one or more hardware processors and/or logic circuits of any suitable type specifically programmed or configured to execute the algorithms and processes described herein. The processor(s) 702 may be configured to fetch and execute computer-readable instructions stored in the computer-readable media 704, which may program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. For example, the computer-readable media 704 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device(s) 102, the computer-readable media 704 may be a tangible non-transitory medium to the extent that, when mentioned, non-transitory computer-readable media exclude media such as energy, carrier signals, electromagnetic waves, and/or signals per se. In some cases, the computer-readable media 704 may be at the same location as the service computing device 102, while in other examples, the computer-readable media 704 may be partially remote from the service computing device 102. For instance, in some cases, the computer-readable media 704 may include a portion of storage in the network storage system(s) 104 discussed above with respect to FIG. 1.

The computer-readable media 704 may be used to store any number of functional components that are executable by the processor(s) 702. In many implementations, these functional components comprise instructions or programs that are executable by the processor(s) 702 and that, when executed, specifically program the processor(s) 702 to perform the actions attributed herein to the service computing device 102. Functional components stored in the computer-readable media 704 may include the user web application 116, the management web application 124, the storage program 130, the database management program 138, the node management program 148, and messaging program 150, each of which may include one or more computer programs, applications, executable code, or portions thereof. Further, while these programs are illustrated together in this example, during use, some or all of these programs may be executed on separate service computing devices 102.

In addition, the computer-readable media 704 may store data, data structures, and other information used for performing the functions and services described herein. For example, the computer-readable media 704 may store the metadata database 132 including the database partitions 134. In addition, the computer-readable media may store the local cache(s) 146. Further, while these data structures are illustrated together in this example, during use, some or all of these data structures may be stored on separate service computing devices 102. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 706 may include one or more software and hardware components for enabling communication with various other devices, such as over the one or more network(s) 106. For example, the communication interface(s) 706 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first client computing device able to communicate with a plurality of metadata database nodes and at least one messaging node,
each metadata database node maintaining a portion of a metadata database based on partitioning of the metadata database into a plurality of partitions to distribute the metadata database across the plurality of metadata database nodes, the plurality of metadata database nodes further in communication with a second client computing device,
the at least one messaging node providing a plurality of message queues configured to receive instructions from the metadata database nodes,
the first client computing device maintaining a first local cache of a first cache type having a first subset of metadata maintained in the metadata database, the second client computing device maintaining a second local cache of a second cache type having a second subset of the metadata maintained in the metadata database, the first cache type corresponding to a first data type and the second cache type corresponding to a second data type that is different from the first data type, the first client computing device being configured by executable instructions to perform operations comprising:
receiving, by the first client computing device, from a user computing device, a first data request, the first data request corresponding to first metadata in the metadata database;
sending, by the first client computing device, a second data request based on the first data request to a first metadata database node of the plurality of metadata database nodes, the second data request causing the first metadata database node to change the metadata in the metadata database;
receiving, by the first client computing device, from a message queue of the plurality of message queues, a cache update message from one of the metadata database nodes and directed to the first cache type based on the change to the metadata in the metadata database, wherein cache update messages for the first cache type are routed separately from cache update messages for the second cache type; and
updating, by the first client computing device, the first local cache of the first cache type based on the cache update message.

2. The system as recited in claim 1, wherein:
receiving the cache update message includes receiving updated metadata added to the metadata database as the change to the metadata in the metadata database; and
updating the first local cache based on the cache update message comprises updating the first local cache to include the updated metadata added to the metadata database.

3. The system as recited in claim 1, wherein updating the first local cache based on the cache update message comprises invalidating at least a portion of the first local cache.

4. The system as recited in claim 1, the operations further comprising receiving the cache update message according to the Advance Message Queuing Protocol.

5. The system as recited in claim 1, wherein the system includes a plurality of the messaging nodes and the plurality of message queues are provided by the plurality of messaging nodes, respectively, wherein each message queue is provided in a respective virtual container.

6. The system as recited in claim 1, wherein the first client computing device executes a first service on the first client computing device, the first service maintaining the first local cache, wherein the first service enables the user computing device to access object data stored in a storage system and corresponding to the metadata maintained in the metadata database.

7. The system as recited in claim 6, wherein the first service is one of:
a user web application; or
a management web application.

8. The system as recited in claim 1, wherein the first data request is a data write request for storing data at a storage system associated with the metadata database.

9. The system as recited in claim 1, wherein updating the first local cache based on the cache update message comprises invalidating at least a portion of the first local cache, the operations further comprising:
receiving a third request from the user computing device;
determining that at least the portion of the first local cache is invalidated; and
sending a query to at least one metadata database node of the plurality of metadata database nodes to determine information from the metadata database related to the third data request.

10. The system as recited in claim 9, further comprising based on receiving a response from the at least one metadata database node, sending metadata information to another computing device associated with a storage system to obtain data over a network from the storage system.

11. A method comprising:
receiving, by a first client computing device, from a user computing device, a first data request, wherein the first client computing device is able to communicate with a plurality of metadata database nodes and at least one messaging node, each metadata database node maintaining a portion of a metadata database based on partitioning of the metadata database into a plurality of partitions to distribute the metadata database across the plurality of metadata database nodes, the plurality of metadata database nodes further in communication with a second client computing device, the at least one messaging node providing a plurality of message queues configured to receive instructions from the metadata database nodes, the first client computing device maintaining a first local cache of a first cache type having a first subset of metadata maintained in the metadata database, the second client computing device maintaining a second local cache of a second cache type having a second subset of the metadata maintained in the metadata database, the first cache type corresponding to a first data type and the second cache type corresponding to a second data type that is different from the first data type;

sending, by the first client computing device, a second data request based on the first data request to a first metadata database node of the plurality of metadata database nodes, the second data request causing the first metadata database node to change the metadata in the metadata database;

receiving, by the first client computing device, from a message queue of the plurality of message queues, a cache update message from one of the metadata database nodes and directed to the first cache type based on the change to the metadata in the metadata database, wherein cache update messages for the first cache type are routed separately from cache update messages for the second cache type; and updating, by the first client computing device, the first local cache of the first cache type based on the cache update message.

12. The method as recited in claim 11, wherein:
receiving the cache update message includes receiving updated metadata added to the metadata database as the change to the metadata in the metadata database; and
updating the first local cache based on the cache update message comprises updating the first local cache to include the updated metadata added to the metadata database.

13. The method as recited in claim 11, wherein there are a plurality of the messaging nodes and the plurality of message queues are provided by the plurality of messaging nodes, respectively, wherein each message queue is provided in a respective virtual container.

14. The method as recited in claim 11, wherein the first client computing device executes a first service on the first client computing device, the first service maintaining the first local cache, wherein the first service enables the user computing device to access object data stored in a storage system and corresponding to the metadata maintained in the metadata database.

15. The method as recited in claim 11, wherein the first local cache is maintained by a first service program executing on the first client computing device, and the second local cache is maintained by a second service program executing on the second client computing devices, wherein the second service program provides a service that is different from a service provided by the first service program.

16. One or more non-transitory computer-readable media storing instructions that, when executed by one or more processors, configure the one or more processors to perform operations comprising:
receiving, by a first client computing device, from a user computing device, a first data request, wherein the first client computing device is able to communicate with a plurality of metadata database nodes and at least one messaging node, each metadata database node maintaining a portion of a metadata database based on partitioning of the metadata database into a plurality of partitions to distribute the metadata database across the plurality of metadata database nodes, the plurality of metadata database nodes further in communication with a second client computing device, the at least one messaging node providing a plurality of message queues configured to receive instructions from the metadata database nodes, the first client computing device maintaining a first local cache of a first cache type having a first subset of metadata maintained in the metadata database, the second client computing device maintaining a second local cache of a second cache type having a second subset of the metadata maintained in the metadata database, the first cache type corresponding to a first data type and the second cache type corresponding to a second data type that is different from the first data type;

sending, by the first client computing device, a second data request based on the first data request to a first metadata database node of the plurality of metadata database nodes, the second data request causing the first metadata database node to change the metadata in the metadata database;

receiving, by the first client computing device, from a message queue of the plurality of message queues, a cache update message from one of the metadata database nodes and directed to the first cache type based on the change to the metadata in the metadata database, wherein cache update messages for the first cache type are routed separately from cache update messages for the second cache type; and updating, by the first client computing device, the first local cache of the first cache type based on the cache update message.

17. The one or more non-transitory computer-readable media as recited in claim 16, wherein:
receiving the cache update message includes receiving updated metadata added to the metadata database as the change to the metadata in the metadata database; and
updating the first local cache based on the cache update message comprises updating the first local cache to include the updated metadata added to the metadata database.

18. The one or more non-transitory computer-readable media as recited in claim 16, wherein there are a plurality of the messaging nodes and the plurality of message queues are provided by the plurality of messaging nodes, respectively, wherein each message queue is provided in a respective virtual container.

19. The one or more non-transitory computer-readable media as recited in claim 16, wherein the first client computing device executes a first service on the first client computing device, the first service maintaining the first local cache, wherein the first service enables the user computing device to access object data stored in a storage system and corresponding to the metadata maintained in the metadata database.

20. The one or more non-transitory computer-readable media as recited in claim 16, wherein the first local cache is maintained by a first service program executing on the first client computing device, and the second local cache is maintained by a second service program executing on the second client computing devices, wherein the second service program provides a service that is different from a service provided by the first service program.

\* \* \* \* \*